(12) United States Patent
Crowther

(10) Patent No.: US 7,394,543 B2
(45) Date of Patent: Jul. 1, 2008

(54) SPECTRAL SELECTION AND IMAGE CONVEYANCE USING MICRO FILTERS AND OPTICAL FIBERS

(75) Inventor: Blake G. Crowther, Preston, ID (US)

(73) Assignee: Utah State University Research Foundation, Logan, UT (US)

( * ) Notice: Subject to any disclaimer, the term of this patent is extended or adjusted under 35 U.S.C. 154(b) by 226 days.

(21) Appl. No.: 11/179,350

(22) Filed: Jul. 12, 2005

(65) Prior Publication Data
US 2006/0017928 A1     Jan. 26, 2006

Related U.S. Application Data

(60) Provisional application No. 60/587,064, filed on Jul. 12, 2004.

(51) Int. Cl.
    *G01N 21/25* (2006.01)
(52) U.S. Cl. .................. 356/419; 356/419; 359/580; 359/588
(58) Field of Classification Search .......... 359/580, 359/588–589; 385/114–116, 121, 122
    See application file for complete search history.

(56) References Cited

U.S. PATENT DOCUMENTS

| 4,639,078 A | 1/1987 | Sheem |
| 4,678,332 A | 7/1987 | Rock et al. |
| 4,716,507 A | 12/1987 | Ames |
| 4,963,906 A | 10/1990 | Goodman |
| 5,608,833 A | 3/1997 | Au et al. |
| 5,682,229 A * | 10/1997 | Wangler .................. 356/141.1 |
| 5,701,382 A | 12/1997 | Grois et al. |
| 6,115,556 A | 9/2000 | Reddington |

(Continued)

OTHER PUBLICATIONS

Lencioni et al., "Design and Performance of the EO-1 Advanced Land Imager," Proc. SPIE vol. 3870, 1999, pp. 269-280.

(Continued)

*Primary Examiner*—Layla G. Lauchman
*Assistant Examiner*—Iyabo S Alli
(74) *Attorney, Agent, or Firm*—Thorpe North & Western LLP

(57) ABSTRACT

The present invention features a fiber optic imaging system for generating a customized spectral response comprising (a) an optional optical source for generating optical energy, (b) an optical system for focusing multi spectral optical energy to form a focal surface; (b) a fiber optic element for conveying the optical energy, wherein the fiber optic element has an input end optically coupled to the focal surface to receive the optical energy and an output end to transmit the conveyed optical energy; and (c) a spectral filter optically coupled to at least one of the input and output ends of the fiber optic element, wherein the spectral filter has a filter passband configured to provide the fiber optic element with a pre-determined wavelength transmittance capacity, such that only predetermined wavelengths of the optical energy are transmitted through the output end, thus achieving a customized spectral response. The fiber optic imaging system may further comprise an imaging array optically coupled to the output end of the fiber optic element and configured to gather the transmitted optical energy and to convert it into a data signal corresponding to an image based on the customized spectral response. An example of this type of configuration is a spectrometer.

41 Claims, 7 Drawing Sheets

U.S. PATENT DOCUMENTS

| | | |
|---|---|---|
| 6,178,039 B1 * | 1/2001 | Fujita ..................... 359/345 |
| 6,459,844 B1 | 10/2002 | Pan |
| 6,512,868 B1 | 1/2003 | Foster et al. |
| 6,663,297 B1 | 12/2003 | Goldstein |
| 6,681,600 B1 | 1/2004 | Mitchell et al. |
| 6,682,875 B2 | 1/2004 | Kriksunov et al. |
| 2004/0032581 A1 * | 2/2004 | Nikoonahad et al. ..... 356/237.2 |

OTHER PUBLICATIONS

Ueno M. et al., "PtSi Schottky-Barrier Infrared Focal Plane Array for ASTER/SWIR" Proc. SPIE vol. 2553, 1995, pp. 56-65.

Waluschka E. et al., MODIS Stray Light Simulation, Proc. SPIE vol. 2864, 1996, pp. 350-360.

* cited by examiner

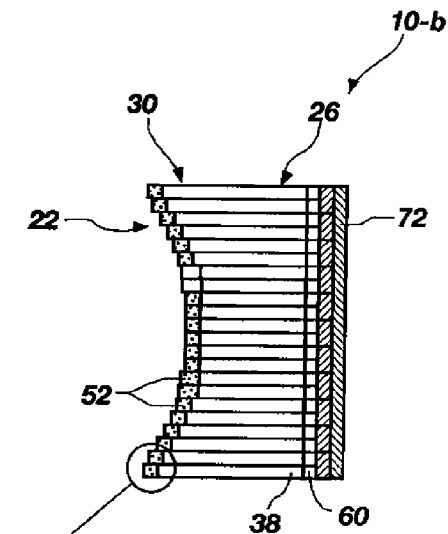
FIG. 3-A
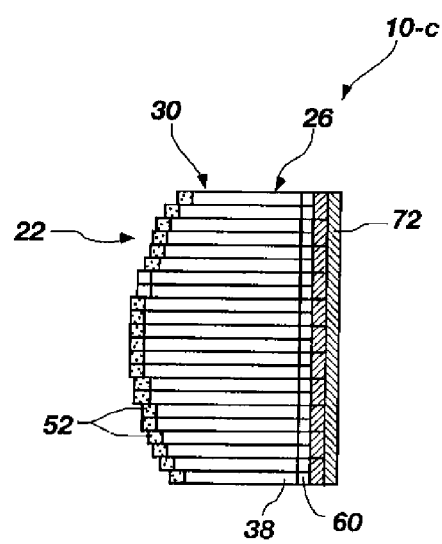
FIG. 4
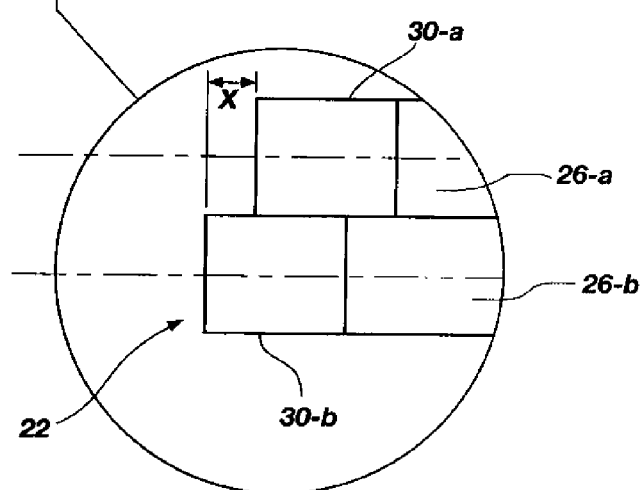
FIG. 3-B

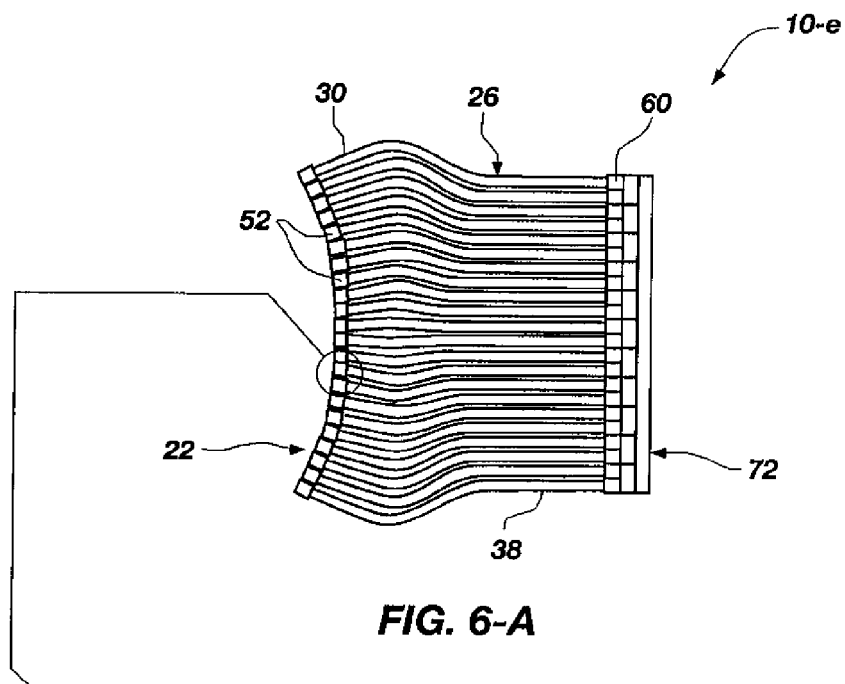
FIG. 6-A
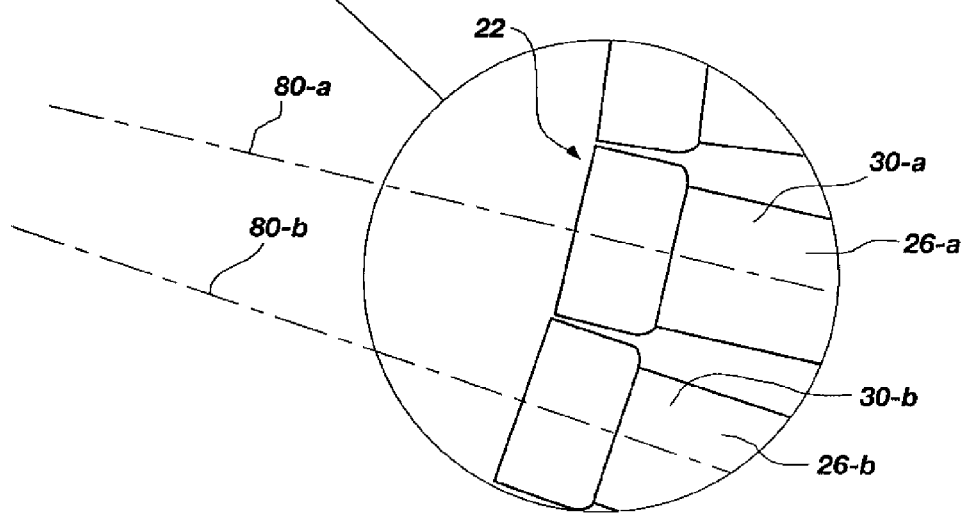
FIG. 6-B

SPECTRAL SELECTION AND IMAGE CONVEYANCE USING MICRO FILTERS AND OPTICAL FIBERS

RELATED APPLICATIONS

This application claims priority to U.S. Provisional Application Ser. No. 60/587,064, filed Jul. 12, 2004, and entitled, "Spectral Selection and Image Conveyance using Micro Filters and Optical Fibers," which is incorporated by reference herein in its entirety.

FIELD OF THE INVENTION

This invention relates to imaging spectrometers, fiber optics, and fiber optic systems, and particularly to a spectral selection and image conveyance system using optical fibers, wherein the optical fibers comprise a specific transmittance wavelength capacity.

BACKGROUND OF THE INVENTION AND RELATED ART

Various systems and devices utilizing fiber optics to convey optical energy, such as an image, are well known in the art. In addition, the use of fiber optical elements near focal planes is also well known in the art. Indeed, fiber optics technology is utilized in a wide variety of applications for transmitting voice, video, and data signals. Fiber optic cables have significant advantages over electrical voice, video and data signal carriers, one of which is their capacity for increased data transfer.

A typical fiber optic cable includes a silica core (glass optical fiber element), a silica cladding, and a protective coating. The glass optical fibers of fiber optic cables have very small diameters, which are susceptible to external influences such as mechanical stress and environmental conditions. The index of refraction of the core is higher than the index of refraction of the cladding to promote internal reflection of light propagating down the core.

Recently, fiber optic elements have been utilized with imaging sensors or imaging arrays to create an imaging system. These systems are typically called fiber face plates and are associated with image intensifiers used in the visible and near-infrared portion of the electromagnetic spectrum.

When an image is formed on a detector array, the image is pixilated. The energy in each pixel is represented electronically in the form of digital bits. Unless some sort of spectral filter is used, this electronic image will include all wavelengths of light to which the detector is sensitive. This monochromatic or single spectral band type of sensor would record overall irradiance at the pixel but would result in a loss of color information.

There are also several types of color imaging systems. A typical imaging sensor uses red, green and blue as primary colors. The system may include red, green and blue transmissive filters or beamsplitters. A color image may be built up in a time sequential fashion by positioning the filters in front of a single detector array in a time sequenced fashion. Alternatively, the color image may be created by splitting the incoming beam of light into red, green, and blue components using the spectral filters and then imaging the beam on to three separate detector arrays; one each for the red, green, and blue colors. Another method of creating a color image is to use spectral filters directly on or close to the detector array distributed according to some predetermined color pattern. One such commonly used pattern is the Bayer pattern.

Prior to the present invention, several electronics instruments for remotely sensing light have been built using the traditional filter deposited on a substrate, including the ALI, ASTER, MISR, MODIS, and SeaWiFS. The disadvantage of the traditional filter substrate approach is that light can couple into adjacent spectral bands. This has been partially solved by placing an opaque layer between the different substrates and filters but this process is still dependent on cutting small pieces that are pre-coated or subsequently coating them. The small pieces must then be glued together to form the final filter. FIG. 11 shows the crosstalk problems and how some of them have been partially addressed in the past.

SUMMARY OF THE INVENTION

Although several objects of some of the various exemplary embodiments have been specifically recited herein, these should not be construed as limiting the scope of the present invention in any way. Indeed, it is contemplated that each of the various exemplary embodiments comprises other objects that are not specifically recited herein. These other objects will be apparent to and appreciated by one of ordinary skill in the art upon practicing the invention as taught and described herein.

In accordance with the invention as embodied and broadly described herein, the present invention features an imaging system comprised of one or more image conveyance elements comprising fiber optic elements having spectral filters operable therewith, wherein the image conveyance elements are present as geometrically registered elements optically coupled to a detector or an array of detectors, otherwise known as an imaging array, wherein the imaging system functions to eliminate the need for a substrate filter coupled or in close proximity to the imaging array. The image conveyance elements, with the spectral filters, comprise multiple, specific passbands, which spectral filters are preferably in the form of a coating applied directly to one or more ends of the fiber optic elements, such that each fiber optic element is provided a specific, pre-determined optical energy transmittance capacity, which is based on the passband of the spectral filter. In other words, each fiber optic element is configured to transmit from its output end only a narrow portion of the available optical energy (i.e., only a specific wavelength or range of wavelengths), which transmitted optical energy is optimally transmitted by the fiber optic element. Providing the fiber optic elements with a specific and pre-determined optical energy transmittance capacity may be accomplished by depositing a single coating at one end of the fiber optic element, or by depositing coatings at both ends. In one embodiment, one end of the fiber optical element is placed at or optically coupled to the focal surface of an optical system, while the other end is placed on, in close proximity to, or otherwise optically coupled to the detector or imaging array to form an imaging system.

Specifically, the present invention features an imaging system for generating a desired spectral response comprising (a) an optical system for focusing multi spectral optical energy to form a focal surface; (b) a fiber optic element for conveying the optical energy, wherein the fiber optic element has an input end optically located at the focal surface to receive the optical energy and an output end to transmit the conveyed optical energy; and (c) a spectral filter optically coupled to at least one of the input and output ends of the fiber optic element, wherein the spectral filter has a passband configured to provide the fiber optic element with a pre-determined wavelength transmittance capacity, such that only pre-determined wavelengths of the optical energy are transmitted through the output end, thus creating a customized filter having a desired spectral response. the customized filter may be configured to transmit multiple, simultaneous and different spectral bandpasses to achieve potentially different spectral responses, with various physical locations about the customized filter corresponding to the different transmitted spectral bandpasses.

The imaging system further comprises an imaging array optically coupled to the output end of the fiber optic element and is configured to gather the transmitted optical energy and to convert it into a data signal corresponding to an image based on the customized spectral response. An example of this type of configuration is a spectrometer.

The spectral filter may comprise a spectral filter coating deposited directly onto at least one of said input and output ends of the fiber optic element, or the spectral filter formed of a suitable structure that is placed adjacent to at least one of the input and output ends of the fiber optic element.

The present invention also features a fiber optic element comprising (a) a fiber optic element for conveying optical energy, wherein the fiber optic element has an input end optically coupled to the focal surface of an optical system to receive the optical energy and an output end to transmit the optical energy; and (b) a spectral filter coating applied to at least one of the input and output ends of the fiber optic element, the spectral filter coating having a filter passband configured to provide the fiber optic element with a pre-determined wavelength transmittance capacity, such that only pre-determined wavelengths of the optical energy are transmitted through the output end to achieve a desired spectral response. The fiber optic element may be combined with other similarly configured fiber optic elements in a bundle to provide a filter arrangement capable of transmitting multiple, simultaneous and different spectral bandpasses to achieve potentially different spectral responses, with various physical locations about said customized filter corresponding to said different transmitted spectral bandpasses.

The present invention further features a method for filtering optical energy transmitted through a fiber optic element to obtain a customized spectral response.

BRIEF DESCRIPTION OF THE DRAWINGS

The present invention will become more fully apparent from the following description and appended claims, taken in conjunction with the accompanying drawings. Understanding that these drawings merely depict exemplary embodiments of the present invention they are, therefore, not to be considered limiting of its scope. It will be readily appreciated that the components of the present invention, as generally described and illustrated in the figures herein, could be arranged and designed in a wide variety of different configurations. Nonetheless, the invention will be described and explained with additional specificity and detail through the use of the accompanying drawings in which:

FIG. 3-A illustrates an exemplary imaging system of the present invention depicting one configuration of image conveyance elements arranged with the input ends located on a nonlinear, concave focal surface and parallel to one another;

FIG. 3-B illustrates a detailed view of the exemplary configuration of image conveyance elements of the imaging system of FIG. 3-A;

FIG. 4 illustrates an exemplary imaging system of the present invention depicting another configuration of the image conveyance elements as arranged with the input ends located on a nonlinear or non-planar, convex focal surface, and also parallel to one another;

FIG. 6-A illustrates an exemplary imaging system of the present invention depicting another configuration of image conveyance elements arranged with the input ends located on a nonlinear, focal surface and non-parallel to one another;

FIG. 6-B illustrates a detailed view of the exemplary configuration of image conveyance elements of the imaging system of FIG. 6-A;

DETAILED DESCRIPTION OF EXEMPLARY EMBODIMENTS

The following detailed description of exemplary embodiments of the invention makes reference to the accompanying drawings, which form a part hereof and in which are shown, by way of illustration, exemplary embodiments in which the invention may be practiced. While these exemplary embodiments are described in sufficient detail to enable those skilled in the art practice the invention, it should be understood that other embodiments may be realized and that various changes to the invention may be made without departing from the spirit and scope of the present invention. Thus, the following more detailed description of the embodiments of the present invention, as represented in FIGS. 1 through 11, is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

The following detailed description and exemplary embodiments of the invention will be best understood by reference to the accompanying drawings, wherein the elements and features of the invention are designated by numerals throughout.

The present invention describes a method and system for generating a customized spectral response from an imaging system utilizing one or more optical fibers coated with a spectral optical coating on one or both ends of the optical fiber, wherein the spectral filter comprises a specific, pre-determined passband that provides each optical fiber with a specific, pre-determined transmittance capacity, such that only pre-determined wavelengths of optical energy generated from an optical source are transmitted through an output end of the optical fiber, thus achieving the customized or desired spectral response. In other words, the present invention features and describes an imaging system comprising spectrally selective image conveyance fibers, such as those arranged in a pre-determined arrangement to provide a filter or filter arrangement. As will be shown below, the imaging system may comprise and the spectrally selective image conveyance fibers may be coupled to one or more focal planes. The present invention functions to eliminate the need for a substrate-type filter, while simultaneously eliminating the problem of undesirable crosstalk or stray light.

It is contemplated that the present invention may be utilized in various applications, including those in the aerospace field, the medical field, communications, surveillance, and others.

Figure 1:
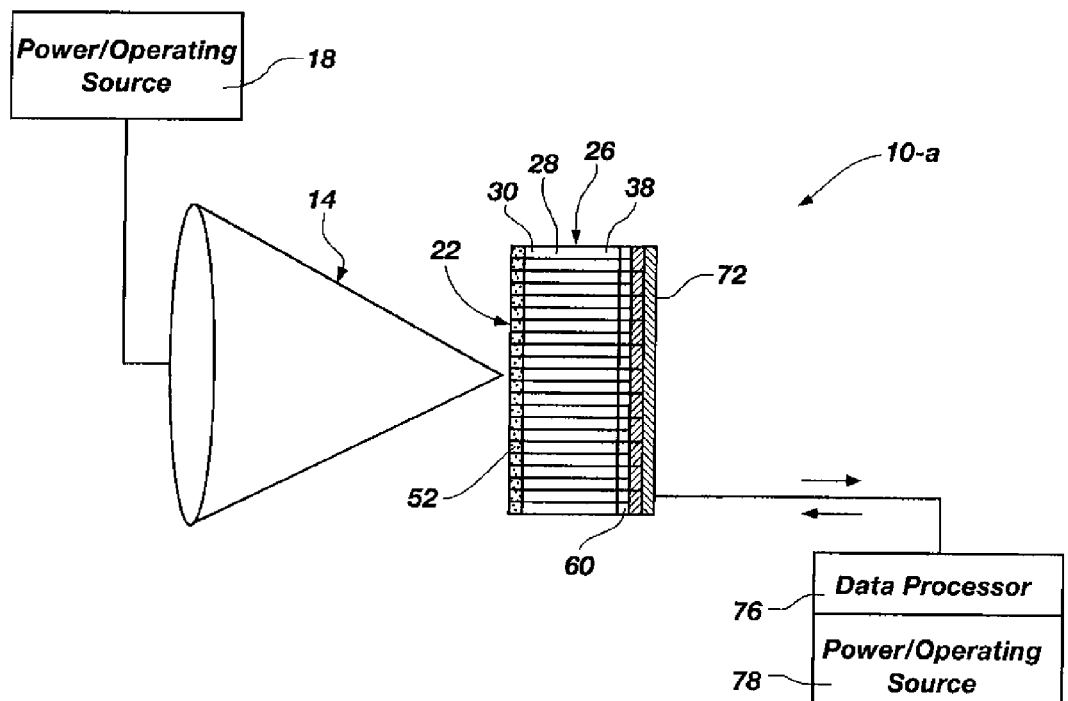
FIG. 1 illustrates one exemplary embodiment of an imaging system comprising a fiber filter and associated optical and detector systems configured to form a fiber filter hyperspectral imager.

With reference to FIG. 1, shown is one exemplary embodiment of a spectral filtration and image conveyance system (hereinafter imaging system) utilizing optical fiber filtering elements, and particularly one exemplary embodiment of a hyperspectral imager. The imaging system 10-a comprises an optical system 14 for focusing multi spectral optical energy (optical energy existing at a variety of wavelengths) to form an optical or focal surface. In one exemplary embodiment, the optical system 14 may be operably coupled to an active optical source 18 that may comprise any system or device commonly known in the art that is capable of generating or providing optical energy specifically for use with the imaging system 10. The focal surface 22 corresponds to the input side of the image conveyance elements 26 and is configured to transmit the focused optical energy at specified wavelengths. The optical surface 22 shown in FIG. 1 comprises a planar or linear optical surface. In another embodiment, the optical energy may be provided by a passive optical source, such as natural or artificial light that exists, but does not exist for the specific purpose of producing light for the imaging system. This may include sunlight, moonlight, light from lamps or bulbs, etc.

The optical system 14, and particularly the optical surface 22, is optically related to at least one, and preferably a plurality or bundle of, optical fiber elements. The optical fiber elements are each configured to comprise or be associated with a spectral filter, thus providing the imaging system with a bundle of spectrally selective image conveyance fibers or spectrally selective image conveyance image conveyance elements 26 (hereinafter image conveyance elements 26). Optically related is intended to mean that the image conveyance elements are positioned and configured to receive the multi spectral optical energy generated by the optical source, whether the image conveyance elements are coupled directly to the optical source or whether they are juxtaposed to or located adjacent the optical source.

Figure 2:
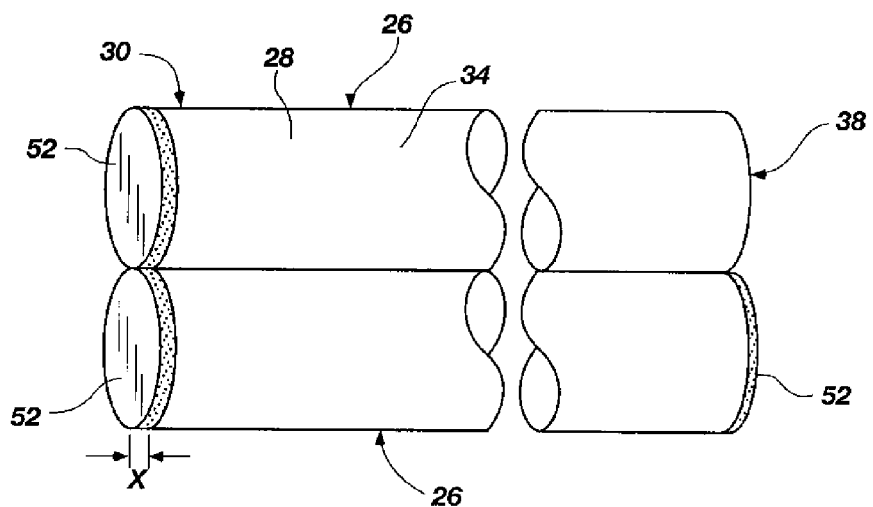
FIG. 2 illustrates a detailed perspective view of two image conveyance elements with one having a spectral filter coating deposited on both its input and output ends, and one having a single spectral filter coating deposited on its input end.

With reference to FIGS. 1 and 2, the image conveyance elements 26 are each configured and designed to receive, through an input end 30, the multi spectral optical energy focused by the optical system 14, to convey or facilitate the propagation of the optical energy from the input end 30 along the length or body 34 of each image conveyance element 26, and to transmit the conveyed optical energy from an output end 38 for one or more later designated uses. FIG. 1 illustrates the imaging system 10 as comprising a bundle of image conveyance elements 26 (two of which are detailed in FIG. 2 to illustrate an exemplary configuration, as well as to illustrate that the spectral filter 52 may be at either end or both ends of the optical fiber element 26), but a single fiber optical element may also be utilized in other exemplary embodiments, depending upon the particular intended use or application of the imaging system. Moreover, the image conveyance elements 26 may comprise any length. The imaging system 10 may comprise image conveyance elements 26 having a relatively short length, such as in the case of a fiber optic face plate, or the imaging system 10-a may comprise image conveyance elements 26 having a relatively long length, such as in the case where use of a remotely located imaging array is preferred.

As shown, each of the image conveyance elements 26 in the bundle comprise an optical fiber element 28 having a spectral filter 52 coated onto or otherwise applied to their input ends 30. The spectral filter 52 applied to each optical fiber element 28 is designed to comprise a specific filter passband, which is defined herein as the quantitative measurement used for identifying the specific wavelength or range of wavelengths of focused multi spectral optical energy permitted to pass through the spectral filter. As such, the spectral filter 52 functions to selectively determine which wavelengths of optical energy are permitted to pass therethrough and into the input end 30 of the image conveyance element 26 for subsequent propagation through the image conveyance element 26 and transmission from the output end 38. The various image conveyance elements 26 in the bundle may each comprise different or similar or the same spectral filters, and therefore passbands. Therefore, the number of image conveyance elements in any given bundle may vary, as well as their respective spectral filters, to achieve a variety of different desired spectral responses.

Although FIG. 1 shows the spectral filter 52 applied to the input ends of the image conveyance elements 26, this is not intended to be limiting in any way. Indeed, the spectral filter 52 may be applied to either the input or output ends of the image conveyance elements 26, or both ends. The primary function of the spectral filter is to permit only a certain wavelength or range of wavelengths of optical energy received by the input end 30 from being transmitted from the output end 38 of the image conveyance elements 26. Therefore, it makes little difference, conceptually, whether the spectral filter 52 is located on the input or the output end. However, it is possible that the different designs of the variety of devices or systems utilizing the technology of the present invention may impose certain restrictions or limitations on the placement, location, and type of spectral filter used.

In one aspect, the spectral filters 52 can be individually applied to the ends of each optical fiber element 28. The techniques and processes used to apply the spectral filters are not discussed in detail herein. Generally, however, the spectral filters 52 may comprise a suitable material or composition or device that may be applied directly to the optical fiber elements 28 as a coating.

Applying different pre-determined and specific spectral filters to different optical fiber element allows a variety of different image conveyance elements to be produced, each with different passband characteristics. These variety of image conveyance elements can then be tagged and stored for later selection and use. Specifically, a plurality of individual image conveyance elements may be pre-manufactured, wherein different image conveyance elements comprise different passbands corresponding to a different wavelength or range of wavelengths of available optical energy. Then, depending upon the desired spectral response, any number of these pre-manufactured image conveyance elements having specific, pre-determined passbands may be selected and arranged into a pre-determined filter arrangement to produce the desired spectral response. In this manner, the imaging and other systems utilizing the present invention are easily customized to create a variety of different spectral responses. For example, a spectrometer, with various sensors, etc., could be fabricated by assembling the appropriate image conveyance elements having pre-determined passband characteristics. Thus, the cost and time latency associated with custom filter procurement could be significantly reduced.

In addition to the advantages discussed above, the image conveyance elements offer immunity to spectral crosstalk, which can be a problem when traditional substrate-type filters are used in proximity to detector or imaging arrays. By utilizing the technology of the present invention, the problem of crosstalk is reduced since the substrate-type filter is eliminated from the imaging system altogether, and since image conveyance elements themselves are inherently immune to crosstalk. Indeed, a significant portion of the crosstalk problems encountered with imaging systems utilizing substrate-type filters occurs when the optical energy is incident on the substrate. Since the present invention allows for the creation of a spectrally selective imaging system, wherein the conventional substrate is replaced by spectrally selective image conveyance elements, and since the input side of the image conveyance elements are located at or in close proximity to the focal surface of the optical system, this source of crosstalk is significantly reduced. In addition, the output end is coupled to or placed in very close proximity to the detector array. Due to the fact that the image conveyance elements are immune to crosstalk, this eliminates the need for opaque blocking between the image conveyance elements, again reducing the overall probability of problematic spectral crosstalk.

In another aspect, the spectral filter 52 is a linear variable filter applied to the collective assortment of optical fiber elements 28 already arranged in a fiber optic bundle. In this embodiment, the desired spectral response is again pre-determined, but the spectral filter applied is a unitary filter configured to allow select wavelengths of optical energy through each optical fiber element 28. The resulting image conveyance elements (collection of optical fiber elements with linear variable filter applied thereon) may then be located at or optically coupled to the focal surface. One method of forming a unitary spectral filter is by utilizing one or more masking techniques commonly known in the art.

Although most embodiments will preferably employ a spectral filter in the form of a coating applied to one or both of the ends of the optical fiber element, it is further contemplated herein that the spectral filter may be configured to be positioned adjacent the optical fiber element. In this configuration, each of the spectral filters is associated with a corresponding optical fiber element, thus resulting in image conveyance elements.

The particular spectral filter utilized is not critical to the invention. Rather, any type of material, device, or composition known in the art that is capable of being applied or coated onto an optical fiber element and that is also capable of selectively filtering certain wavelengths of optical energy while selectively absorbing others is contemplated for use herein. As indicated, the present invention comprises one or more optical fiber elements having one or both ends coated with a spectral filter so that only a narrow portion of the optical spectrum is optimally transmitted. In one exemplary embodiment, the optical fiber element may have deposited on one or both of its ends a spectral filter comprising a narrow bandpass optical filter. For example, the narrow bandpass optical filter may be located extremely close to or directly on a detector or imaging array. Alternative coating options are also viable, such as short wave pass filters or coatings combined with long wave pass filters or coatings on either end of the optical fiber element. In addition, one of the ends of the image conveyance elements may comprise an anti-reflection (AR) coating 60, as is commonly known in the art. An anti-reflective coating 60 is shown in FIG. 1 as being deposited on the output ends 38 of the bundle of image conveyance elements 26.

FIG. 1 further illustrates the bundle of image conveyance elements 26 optically coupled to a detector or detector array 72, sometimes referred to as an imaging array, having a plurality of individual or other appropriately configured pixels arrayed thereon. The detector or imaging array 72 is operably coupled to an electronic readout or computer 76 configured to receive, process, and store the data signals from the imaging array 72 corresponding to the spectral response, as well as to a power/operating source 78. Moreover, with reference to all of the embodiments described herein, the imaging system contemplated can be very small in size, and accordingly the imaging array can have a lower pixel count than would otherwise be desirable. As technology advances, pixel size can be reduced, thereby providing clearer images and data. However, when using a lower number of pixels in an imaging array, the resolution of the image provided by the device can be enhanced through software executable on the computer 76 in processing the image data received.

The image conveyance elements 26 may be optically coupled to the imaging array 72 by direct contact between the output end 38 of the optical fiber element and the imaging array 72. Such direct contact can include an optically transparent or translucent bonding material at the interface between the output end 38 and the imaging array 72. For example an epoxy can be used to bond the image conveyance elements 26 to the imaging array 72. Likewise, an epoxy can also be used to bond the utility guide to the solid state imaging device or SSID. Alternatively, the image conveyance elements 26 may be optically coupled to the imaging array 72 through an intermediate optical device, such as a second optical fiber element or a color filter, or an appropriately shaped optical device, such as a prism or lens.

With reference to FIGS. 3 and 4, the image conveyance elements may be arranged in a manner convenient to the optical system and detector or imaging arrays under consideration so as to achieve the desired spectral sensitivity. As indicated above, it is preferred that the spectral filter comprises a spectral filter coating deposited directly onto the ends of the various optical fiber elements. However, also as indicated, the spectral filter may be bonded to or placed in proximity to the optical fiber elements. In some embodiments, no filter may be employed at all.

FIGS. 3-A and 3-B illustrate another exemplary embodiment of an arrangement of image conveyance elements 26. In this particular embodiment, the imaging system 10-b, and particularly the optical system (not shown), comprises a non-linear or non-planar, concave focal surface 22. Image conveyance elements 26 (optical fiber elements 28 having spectral filters 52 applied thereto or associated therewith) are arranged together so that input ends 30 accommodate the nonlinear focal surface 22, while still maintaining the optical connection between the optical system and the image conveyance elements 26. As shown, the several image conveyance elements 26 are oriented parallel to one another, such that their axes are parallel to one another. In this configuration, and in order to create the nonlinear focal surface 22, the input ends 30 of each of the several image conveyance elements 26 are offset from one another a pre-determined distance.

FIG. 3-B depicts how the axes 80-a and 80-b of the respective image conveyance elements 26-a and 26-b are parallel to one another. FIG. 3-B also depicts how the input ends 30-a and 30-b are offset from one another a distance x, which may vary between the several different image conveyance elements 26.

FIG. 3 further illustrates output ends 38 that are optically coupled to an imaging array 72 having individual or other appropriately configured pixels in a similar manner as described in FIG. 1. The output ends 38 may comprise an AR coating 60 applied thereon, also as described in FIG. 1.

FIG. 4 illustrates still another exemplary embodiment of an imaging system in accordance with the present invention. In this particular embodiment, the imaging system 10-c, and particularly the optical system (not shown), comprises a plurality of image conveyance elements 26 (optical fiber elements 28 having spectral filters 52 applied thereto or associated therewith) arranged to form a nonlinear, convex focal surface 22. Like those discussed above with respect to FIG. 3, the image conveyance elements 26 are oriented so that they and their longitudinal axes are parallel to one another. Again, image conveyance elements 26 are arranged to be offset from one another so that the respective input ends 30 accommodate the nonlinear focal surface 22, while still maintaining the optical connection between the optical system and the image conveyance elements 26.

FIG. 4 further illustrates output ends 38 that are optically coupled to an imaging array 72 having individual or other appropriately configured pixels in a similar manner as described in FIG. 1. The output ends 38 may comprise an AR coating 60 applied thereon, also as described in FIG. 1.

Figure 5:
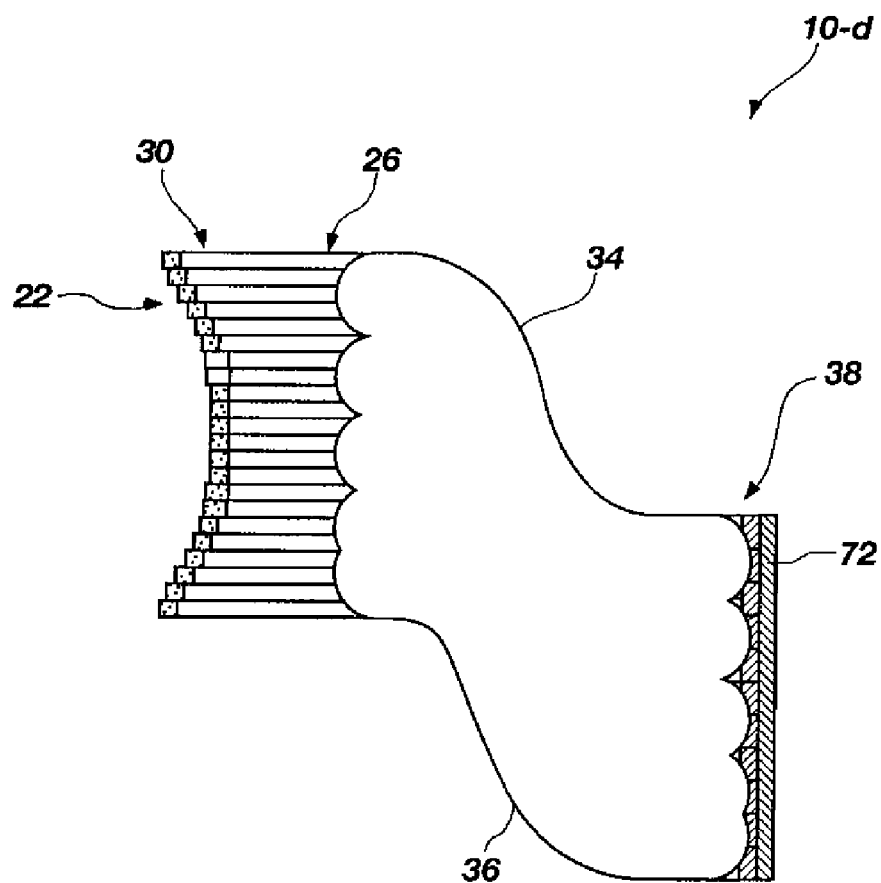
FIG. 5 illustrates an exemplary embodiment of an imaging system having a bundle of image conveyance elements optically connecting a remote imaging or detector array.

FIG. 5 illustrates still another exemplary embodiment of an imaging system in accordance with the present invention. In this particular embodiment, the imaging system 10-d, and particularly the optical system (not shown), comprises a plurality of image conveyance elements 26 (optical fiber elements 28 having spectral filters 52 applied thereto or associated therewith) arranged to form a nonlinear, concave focal surface 22. Again, the image conveyance elements 26 are oriented such that their longitudinal axes are parallel to one another. In addition, the image conveyance elements 26 are arranged together so that input ends 30 accommodate the nonlinear focal surface 22, while still maintaining the optical connection between the optical system and the image conveyance elements 26. FIG. 5 further illustrates output ends 38 that are optically coupled to an imaging array 72 located in a remote location. Hence, image conveyance elements 26 are comprised of a suitable length to convey the optical energy from the input ends 30 to the output ends 38 where the conveyed optical energy may further be transmitted to the imaging array 72. In addition, the body portion 34 of fiber optic elements 26 may be contained within a protective fiber cable 36.

FIG. 5 further illustrates output ends 38 that are optically coupled to an imaging array 72 having individual or other appropriately configured pixels in a similar manner as described in FIG. 1. The output ends 38 may comprise an AR coating 60 applied thereon, also as described in FIG. 1.

FIGS. 6-A and 6-B illustrate still another exemplary embodiment of an imaging system utilizing fiber optic filtering elements in accordance with the present invention. Specifically, FIGS. 6-A and 6-B illustrate an exemplary arrangement or configuration of image conveyance elements 26 (optical fiber elements 28 having spectral filters 52 applied thereto or associated therewith). Similar to the imaging system 10-b discussed above and shown in FIG. 3, the imaging system 10-e of FIGS. 6-A and 6-B comprises a curved or non-linear or non-planar focal surface 22. However, unlike the imaging system 10-b in which the input ends are parallel to one another at the focal surface, the input ends 30 of the image conveyance elements 26 present within the imaging system 10-e are not parallel to one another at the focal surface 22. Instead, the image conveyance elements 26, and particularly the input ends 30, are positioned within a curved image plane. In other words, with reference to FIG. 6-B, the image conveyance elements 26-a and 26-b are oriented such that their longitudinal axes, shown as axes 80-a and 80-b, respectively, are not parallel to one another, but normal to the focal surface 22, thus resulting in the input direction at each input end 30-a and 30-b for each of the image conveyance elements 26-a and 26-b being different.

Providing a non-parallel configuration of image conveyance elements is advantageous for several reasons. First, such a possible configuration of image conveyance elements provides greater flexibility in the design of the optical system producing the image. Second, the orientation of the various image conveyance elements in a curved image plane may function to increase the radiometric throughput of the fiber-detector subsystem. Third, orienting the input ends 30 in a curved image plane functions to optimize the radiometric throughput and image resolution of the imaging system. Other advantages may be apparent to those skilled in the art.

FIG. 6-A further illustrates output ends 38 that are optically coupled to an imaging array 72 having individual or other appropriately configured pixels in a similar manner as described in FIG. 1. The output ends 38 may comprise an AR coating 60 applied thereon, also as described in FIG. 1.

Figure 7:
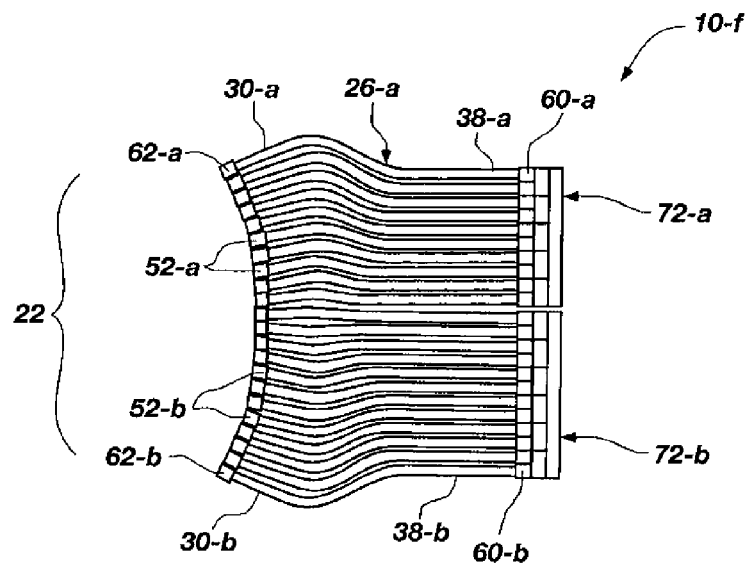
FIG. 7 illustrates an exemplary imaging system of the present invention depicting a bundle of image conveyance elements as associated with multiple detector arrays.

FIG. 7 illustrates still another exemplary embodiment of an imaging system utilizing fiber optic filtering elements in accordance with the present invention. Specifically, FIG. 7 illustrates an exemplary arrangement or configuration of image conveyance elements 26 (optical fiber elements 28 having spectral filters 52 applied thereto or associated therewith). In this particular embodiment, however, the imaging system 10-f comprises multiple focal planes or multiple detector arrays, shown as detector arrays 72-a and 72-b, sometimes referred to as imaging arrays, having a plurality of individual or other appropriately configured pixels arrayed thereon. Indeed, the imaging system may comprise a single or a plurality of detector arrays. In a multiple detector array configuration, each detector array may or may not necessarily be the same size, or comprise the same sensitivity or other characteristics. As shown, the image conveyance elements 26-a, and particularly the output ends 38-a, are optically coupled to detector or detector array 72-a. Likewise, the image conveyance elements 26-b, and particularly the output ends 38-b, are optically coupled to detector or detector array 72-b. In addition, output ends 38-a and 38-b are shown as comprising an AR coating 60-a and 60-b, respectively. Each multiple detector array utilized is preferably configured in a similar manner and functions in a similar way as the detector array described above and shown in FIG. 1.

Similar to the imaging system 10-e discussed above and shown in FIG. 6-A, the imaging system 10-f of FIG. 7 comprises a curved or non-linear focal surface 22, with each of the various image conveyance elements 26-a and 26-b, and their input ends 30-a and 30-b, oriented within a curved image plane, such that their longitudinal axes are in a non-parallel relationship with one another at the focal surface 22. Each of the input ends 30-a and 30-b comprise a spectral filter 52-a and 52-b, respectively, with each group of image conveyance elements 26-a and 26-b making up the focal surface 22.

FIG. 7 further illustrates the input ends 30-a and 30-b comprising an AR coating 62-a and 62-b, respectively. This coating may be similar to the one described above.

Figure 8:
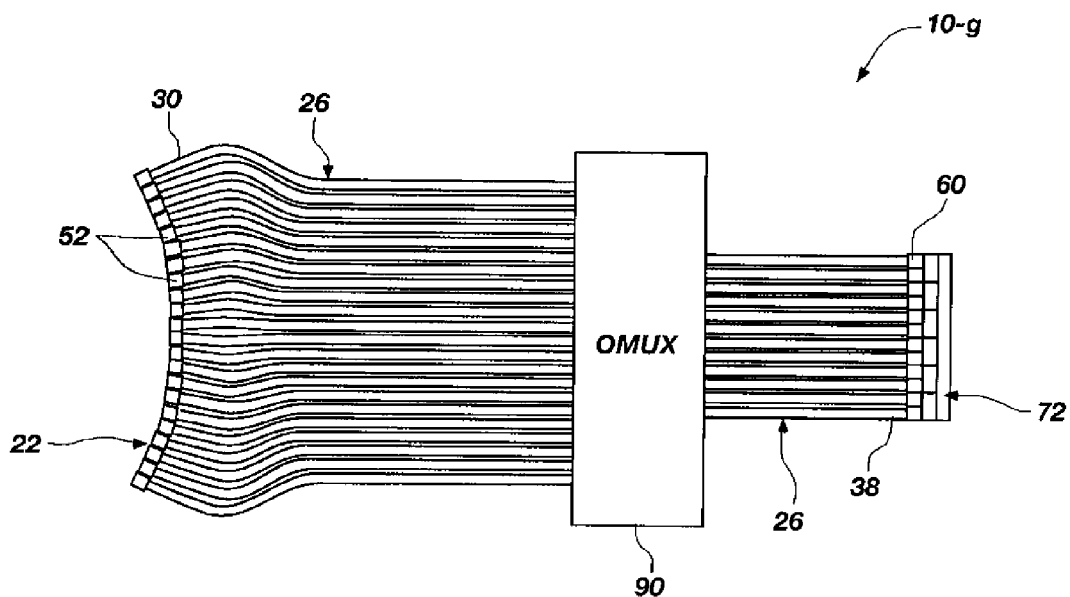
FIG. 8 illustrates an exemplary imaging system of the present invention depicting a bundle of image conveyance elements as associated with an optical multiplexer.

FIG. 8 illustrates still another exemplary embodiment of an imaging system utilizing fiber optic filtering elements in accordance with the present invention. Specifically, FIG. 8 illustrate an exemplary arrangement or configuration of image conveyance elements 26 (optical fiber elements 28 having spectral filters 52 applied thereto or associated therewith). Similar to the imaging system 10-b discussed above and shown in FIG. 3, the imaging system 10-g of FIG. 8 comprises a curved or non-linear focal surface 22. In this particular embodiment, however, the imaging system 10-g comprises an optical multiplexer 90. In some embodiments, it may be undesirable to couple directly to a sufficient number of detector arrays because, for example, the detector arrays may produce excessive heat depending upon the particular environment or other factors that may be at work. As such, it may be preferable to utilize or incorporate the optical multiplexer 90 to rapidly connect various regions of interest in the field of view to one or more detector arrays. As shown, the optical multiplexer 90 is configured to couple to the image conveyance elements 26. The optical multiplexer 90 comprises a plurality of input and output fibers (not shown) whose geometrical relationships are preserved such that the resultant image is preserved. The optical multiplexer 90 is not specifically described herein,.

FIG. 8 further illustrates output ends 38 that are optically coupled to one or more imaging or detector arrays, shown as imaging or detector array 72, having individual or other appropriately configured pixels in a similar manner as described in FIG. 1. The output ends 38 may comprise an AR coating 60 applied thereon, also as described in FIG. 1.

It is noted herein that the above identified embodiments as specifically described are not meant to be limiting in any way. Indeed, each embodiment may comprise other configurations that are not specifically described herein. For example, the embodiments shown in FIGS. 3-8 may comprise a concave or convex, non-planar or nonlinear or curved focal surface 22. Alternatively, each may comprise a linear focal surface 22, such as the one illustrated in FIG. 1. Still further, the image conveyance elements 26 in each of the above-described embodiments may comprise various types of spectral filters and/or AR coatings other than those specifically set forth. In keeping with the spirit of the present invention, the several different possible variants to each of the several embodiments will be obvious to one skilled in the art.

The individual image conveyance elements may be of any conceivable and appropriate cross-sectional shape, including round, square, etc. In addition, the size of the image conveyance elements may be varied to correspond to the pixel size of the detector or imaging array and the point spread function of the optical system to achieve some control on the spectral resolution of each imaging system. The length of the image conveyance elements may also be varied. For example, it may be desirable to minimize the length of the image conveyance elements to satisfy packaging constraints. In other circumstances, it may be desirable to have longer image conveyance elements and locate the detector array at a more remote location. The lengths of the individual image conveyance elements making up the imaging system need not be exactly the same length as long as the ends are located near the focal and detector array surfaces. Thus, tolerances on the lengths of the image conveyance elements could be somewhat less stringent as long as their input and output ends are controlled.

One particular application of the present invention is the creation of hyperspectral sensors that are smaller and lighter than traditional grating systems. The fabricated hyperspectral sensors utilizing the technology of the present invention have a higher radiometric throughput since their spectral response is not based on light passing through small apertures or slits. The fact that the spectral filters are coated on, applied to, or otherwise associated with the ends of the various fiber optic elements means that the optical energy or light is contained within the fiber optic elements (image conveyance elements) until it is incident on the detector or imaging array, which is unlike prior related filters utilizing a substrate-type filter that have had problems with optical energy from one spectral channel coupling into adjacent channels as a result of the transmission of the optical energy along the filter substrates. As discussed above, this undesirable effect is commonly referred to as spectral crosstalk. The spectral filter functions to eliminate any unwanted optical energy transmission or spectral crosstalk problems.

Thus, the assembly of spectral filters from coated fiber optical elements does nothing to destroy that immunity.

The present invention also provides the ability to mix or "dial in" the desired color response without having to incur the typical cost or time associated with the production or fabrication of a custom filter. Indeed, one or both ends of several optical fiber elements may be pre-coated with spectral filter coatings of different filter passbands. The spectrum of available wavelengths of optical energy may be selectively filtered using filters of different, pre-determined passbands. Therefore, several optical fiber filters may be pre-coated with spectral filters and then sorted according to their passband for later selective use in creating or forming a fiber optic imaging system, in which the pre-coated optical fiber elements (resulting in various image conveyance elements) are arranged or bundled together in a pre-determined filter arrangement to achieve a desired spectral response, which spectral response is based upon arranging the appropriate pre-sorted and pre-coated optical fiber elements into a fiber bundle as discussed above.

One particular advantage of prior related fiber optic sensors that utilize various filters that have been deposited on substrates and subsequently placed over detector or imaging arrays is that a substantial reduction in both size and weight of the sensors has been realized, as well as an improvement in the instrument throughput. The present invention is capable of maintaining a similar reduction in both size and weight. In addition to this, as indicated above, some embodiments of the present invention are capable of being located on a non-planar or nonlinear focal surface or a linear one, which ultimately provides an additional degree of flexibility in the design of such sensors. There is also a stray light performance improvement over the traditional filter approach. All of these advantages result in a modular system that potentially performs better, is less expensive, and is less time consuming to produce than currently possible, depending on the exact details of the instrument being designed.

Figure 9:
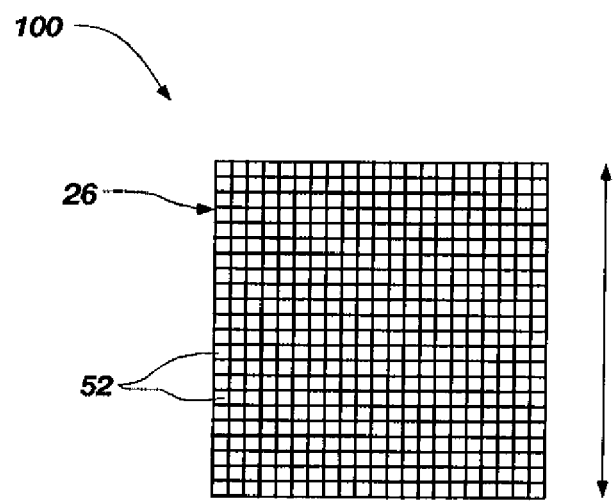
FIG. 9 illustrates a top view of an exemplary imaging system, wherein the image conveyance elements, having spectral filter coatings deposited thereon, are arranged to form a spectrometer.

One particular application of the present invention is the fabrication or manufacture of a spectrometer in which the optical fiber elements, each having optically coupled thereto one or more spectral filters, are optically coupled to a detector array. Exemplary spectrometers utilizing the technology of the present invention are illustrated in each of FIGS. 1, and 3-9. With reference to FIG. 9, shown is a top view of an exemplary spectrometer 100 manufactured by arranging the spectral filter coated optical fiber elements (shown as individual spectral filter coatings 52) on the detector array in such a way that the desired spectral response or sensitivity is changed across the face of the detector as a result of the different coating configurations and the particular sorting arrangement or configuration of the spectral filter coated fiber optic elements. A spectrum of any imaged point could then be acquired by scanning the spot across the array in the direction of the changing spectral response/sensitivity using any scanning technology commonly known in the art. Thus, a data cube consisting of two spatial dimensions and one spectral dimension could be acquired by such scanning. The direction of motion or scan for this particular spectrometer is illustrated in FIG. 9 by the arrows.

Figure 10:
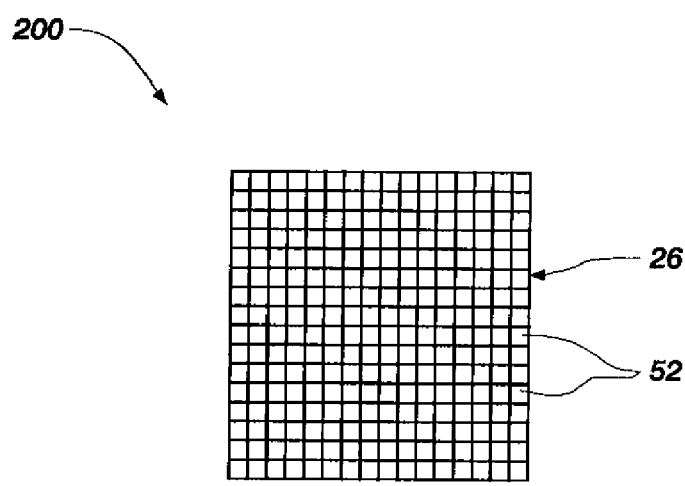
FIG. 10 illustrates a top view of an exemplary imaging system, wherein the image conveyance elements, having spectral filter coatings deposited thereon, are arranged to form a three-color image arranged in a pre-determined color mixture pattern, namely the Bayer color mixture pattern.
Figure 11:
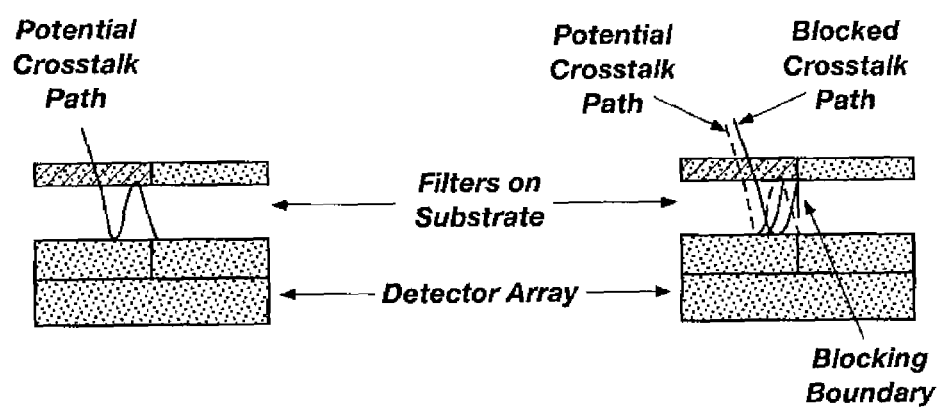
FIG. 11 illustrates a block diagram of a prior art imaging system utilizing a substrate-type filter located at a focal surface.

Another particular application of the present invention would be the formation of color images by interspersing the desired spectral filter coated optical fiber elements (image conveyance elements) according to some pre-determined geometric and/or color mixture pattern, such as a Bayer color mixture pattern. FIG. 10 illustrates a top view of a bundle of image conveyance elements 26 having spectral filter coatings 52 thereon arranged to form a three-color image, namely a pre-determined color mixture pattern arranged in the Bayer pattern. Of course, other pre-determined color mixture patterns are also contemplated.

The present invention further features a method of filtering optical energy transmitted through a optical fiber element to obtain a customized spectral response comprising (a) coating at least one end of a plurality of optical fiber elements with a spectral filter coating having a pre-determined passband to obtain an image conveyance element, wherein the spectral filter is configured to provide each of the image conveyance elements with a specific, pre-determined transmittance capacity, such that only pre-determined wavelengths of optical energy generated from an optical source are transmitted through an output end of the image conveyance element; (b) arranging a pre-determined number of the pre-coated image conveyance elements according to their individual respective passband to obtain a pre-determined filter arrangement configured to create a customized filter designed to produce a desired spectral response.

The method further comprises interchanging at least one of the image conveyance elements with at least one other image conveyance element having a different spectral filter coating (hence a different passband) to alter the spectral response. In this manner, an imaging system may be further customized.

The plurality of optical fiber elements may be individually coated with a spectral filter coating, or they may be associated with a spectral filter configured to be applied to a collection of bundled optical fiber elements. As such, coating the ends of the optical fiber elements with a spectral filter represents only a single exemplary embodiment or method of obtaining an image conveyance element.

The method may further comprise optically coupling an imaging or detector array to the image conveyance elements, wherein the imaging array is configured to gather the transmitted wavelengths of the optical energy and to convert the transmitted wavelengths into data signals corresponding to an image based on the customized spectral response.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

More specifically, while illustrative exemplary embodiments of the invention have been described herein, the present invention is not limited to these embodiments, but includes any and all embodiments having modifications, omissions, combinations (e.g., of aspects across various embodiments), adaptations and/or alterations as would be appreciated by those in the art based on the foregoing detailed description. The limitations in the claims are to be interpreted broadly based the language employed in the claims and not limited to examples described in the foregoing detailed description or during the prosecution of the application, which examples are to be construed as non-exclusive. For example, in the present disclosure, the term "preferably" is non-exclusive where it is intended to mean "preferably, but not limited to." Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. Accordingly, the scope of the invention should be determined solely by the appended claims and their legal equivalents, rather than by the descriptions and examples given above.

What is claimed and desired to be secured by Letters Patent is:

1. A method of filtering multi-spectral optical energy to obtain a customized spectral response, said method comprising:

arranging a pre-determined number of image conveyance elements to obtain a pre-determined filter arrangement, each of said image conveyance elements comprising an optical fiber element, and a spectral filter operable therewith having a pre-determined passband that provides said fiber optic element with a specific, pre-determined transmittance capacity, wherein only pre-determined wavelengths of said multi-spectral optical energy are transmitted through an output end of said fiber optic element, said pre-determined filter arrangement being capable of transmitting multiple, simultaneous and different spectral bandpasses to achieve potentially different spectral responses, with various physical locations about said pre-determined filter arrangement corresponding to said different transmitted spectral bandpasses.

2. The method of claim 1, further comprising interchanging at least one of said fiber optic elements with at least one other fiber optic element having a different spectral filter coating to alter said spectral response.

3. The method of claim 1, wherein said pre-determined filter arrangement is configured to form a spectrometer.

4. The method of claim 1, wherein said pre-determined filter arrangement is configured to form a hyperspectral imager.

5. The method of claim 1, further comprising optically coupling at least one imaging array to said fiber optic elements, said at least one imaging array configured to gather said transmitted wavelengths of said optical energy and to convert said transmitted wavelengths into data signals corresponding to an image based on said customized spectral response.

6. The method of claim 5, wherein said fiber optic elements are coupled to multiple imaging arrays, wherein at least some of said imaging arrays comprise different characteristics.

7. The method of claim 6, wherein said coupling comprises locating said imaging array at a remote location.

8. The method of claim 1, wherein each of said plurality of fiber optic elements comprises an individually coated spectral filter.

9. The method of claim 1, wherein said spectral filter comprises a linear variable filter applied to multiple fiber optic elements as a collective bundle.

10. The method of claim 1, further comprising associating said image conveyance elements with an optical system configured to focus multi spectral optical energy to form a focal surface.

11. The method of claim 10, further comprising orienting said image conveyance elements in a parallel manner with respect to one another.

12. The method of claim 10, further comprising orienting said image conveyance elements in a non-parallel manner with respect to one another, wherein an end of each of said image conveyance elements is normal to said focal surface, thus optimizing radiometric throughput and image resolution.

13. The method of claim 5, further comprising utilizing an optical multiplexer to rapidly connect various regions of interest in a field of view to said imaging array, said optical multiplexer comprising input and output fibers maintained in an operable geometric relationship.

14. An imaging system utilizing fiber optic filtering elements for generating a desired spectral response, said imaging system comprising:
an optical system for focusing multi spectral optical energy to form a focal surface;
at least one fiber optic element for conveying said optical energy, said fiber optic element having an input end optically located at said focal surface to receive said focused optical energy and an output end to transmit said conveyed optical energy; and
a spectral filter optically coupled to at least one of said input and output ends of said fiber optic element, said spectral filter having a filter passband configured to provide said fiber optic element with a pre-determined wavelength transmittance capacity, wherein only pre-determined wavelengths of said optical energy are transmitted through said output end to create a customized filter having a desired spectral response,
said customized filter being capable of transmitting multiple, simultaneous and different spectral bandpasses to achieve potentially different spectral responses, with various physical locations about said customized filter corresponding to said different transmitted spectral bandpasses.

15. The imaging system of claim 14, further comprising at least one imaging array optically coupled to said output end of said fiber optic element and configured to gather said transmitted optical energy and to convert said transmitted optical energy into a data signal corresponding to an image based on said customized spectral response.

16. The imaging system of claim 14, wherein said fiber optic element is coupled to multiple imaging arrays, wherein at least some of said imaging arrays comprise different characteristics.

17. The imaging system of claim 14, wherein said spectral filter comprises a spectral filter coating deposited directly onto at least one of said input and output ends of said fiber optic element.

18. The imaging system of claim 14, wherein said spectral filter is placed adjacent to said at least one of said input and output ends of said fiber optic element.

19. The imaging system of claim 14, wherein said optical energy is provided from a passive optical source.

20. The imaging system of claim 14, wherein said optical energy is generated by an active optical source.

21. The imaging system of claim 14, wherein said focal surface is linear.

22. The imaging system of claim 14, wherein said focal surface is nonlinear.

23. The imaging system of claim 22, wherein said input end of said fiber optic element is optically located at said nonlinear focal surface in an orientation normal to said nonlinear focal surface, thus optimizing radiometric throughput and image resolution.

24. The imaging system of claim 15, further comprising an optical multiplexer used to rapidly connect various regions of interest in a field of view to said imaging array, said optical multiplexer comprising input and output fibers maintained in an operable geometric relationship.

25. An imaging system utilizing fiber optic filtering elements for generating a desired spectral response comprising:
an optical system for focusing multi-spectral optical energy, said optical system comprising a focal surface configured to transmit said multi-spectral optical energy at a variety of wavelengths;
an array of fiber optic elements coupled together in a pre-determined filter arrangement, said fiber optic elements comprising an input end optically coupled to said focal surface to receive said focused multi-spectral optical energy and an output end to transmit said conveyed multi-spectral optical energy;
a spectral filter coating applied to at least one of said input and output ends of said array of fiber optic elements, said spectral filter coating having a passband configured to provide each of said fiber optic elements with a pre-determined wavelength transmittance capacity, wherein only pre-determined wavelengths of said optical energy are transmitted through said output ends to create a customized filter having a desired spectral response, said customized filter being capable of transmitting multiple, simultaneous and different spectral bandpasses to achieve potentially different spectral responses, with various physical locations about said customized filter corresponding to said different transmitted spectral bandpasses; and
at least one imaging array optically coupled to said output ends of said fiber optic elements, said imaging array configured to gather said transmitted multi-spectral optical energy and to convert said transmitted multi-spectral optical energy into data signals corresponding to an image based on said desired spectral response.

26. The imaging system of claim 25, wherein said pre-determined filter arrangement comprises fiber optic elements having different said passbands to create a customized filter.

27. The imaging system of claim 25, wherein said spectral filter is applied individually to each of said fiber optic elements prior to coupling them together so as to obtain a plurality of pre-coated fiber optic elements of varying passband.

28. The imaging system of claim 25, wherein said spectral filter comprises a linear variable filter applied to a collective arrangement of coupled fiber optic elements subsequent to coupling said fiber optic elements together.

29. The imaging system of claim 25, wherein said pre-determined filter arrangement comprises said fiber optic elements arranged to form a spectrometer.

30. The imaging system of claim 25, wherein said pre-determined filter arrangement comprises said fiber optic elements arranged to form a simultaneous three-color image.

31. The fiber optic imaging system of claim 30, wherein said three-color image is in a pre-determined color mixture pattern.

32. The imaging system of claim 31, wherein said predetermined color mixture pattern comprises a Bayer color mixture pattern.

33. The imaging system of claim 25, wherein said focal surface comprises a linear geometric configuration.

34. The imaging system of claim 25, wherein said focal surface comprises a nonlinear or curved geometric configuration.

35. The imaging system of claim 34, wherein said fiber optic elements are nonparallel to one another, and wherein said input ends of said fiber optic elements are oriented normal to said nonlinear focal surface, thus optimizing radiometric throughput and image resolution.

36. The imaging system of claim 25, wherein said spectral filter coating comprises a narrow bandpass optical filter.

37. The imaging system of claim 25, wherein said fiber optic elements comprise an anti reflective coating on an end opposite that coated with said spectral filter coating.

38. The imaging system of claim 25, wherein said fiber optic elements comprise a short wave pass coating combined with a long wave pass coating on one of said input or output ends.

39. The imaging system of claim 25, wherein said fiber optic elements are varied in size to correspond to a pixel size of said imaging array and a point spread function of said optical system to achieve control of a spectral resolution of said imaging system.

40. The imaging system of claim 25, further comprising an optical multiplexer used to rapidly connect various regions of interest in a field of view to said imaging array, said optical multiplexer comprising input and output fibers maintained in an operable geometric relationship.

41. A fiber optic element comprising:
a fiber optic element for conveying multi-spectral optical energy, said fiber optic element having an input end to receive said multi-spectral optical energy and an output end to transmit said multi-spectral optical energy; and
a spectral filter coating applied to at least one of said input and output ends of said fiber optic element, said spectral filter coating having a filter passband configured to provide said fiber optic element with a pre-determined wavelength transmittance capacity, wherein only predetermined wavelengths of said multi-spectral optical energy are transmitted through said output end to achieve a desired spectral response,
said fiber optic element being operable with a bundle of similarly configured fiber optic elements to create a customized filter capable of transmitting multiple, simultaneous and different spectral bandpasses to achieve potentially different spectral responses, with various physical locations about said customized filter corresponding to said different transmitted spectral bandpasses.

* * * * *